United States Patent [19]

Jahn

[11] 4,177,491

[45] Dec. 4, 1979

[54] CLAMPING DEVICE FOR DISK-SHAPED MEMORY SHEETS

[75] Inventor: Emil Jahn, Pforzheim, Fed. Rep. of Germany

[73] Assignee: International Standard Electric Corporation, New York, N.Y.

[21] Appl. No.: 869,823

[22] Filed: Jan. 16, 1978

[30] Foreign Application Priority Data

Mar. 1, 1977 [DE] Fed. Rep. of Germany ....... 2708798

[51] Int. Cl.² .......................... G11B 5/82; G11B 25/04
[52] U.S. Cl. ....................................... 360/135; 360/99; 360/133
[58] Field of Search .................. 360/135, 133, 99, 86; 206/444; 346/137

[56] References Cited

U.S. PATENT DOCUMENTS

| | | | |
|---|---|---|---|
| 3,593,332 | 7/1971 | Strehl | 360/97 |
| 3,668,658 | 6/1972 | Flores et al. | 360/97 |
| 3,670,315 | 6/1972 | Fowler | 360/97 |
| 4,071,869 | 1/1978 | Feierabend et al. | 360/135 |
| 4,078,246 | 3/1978 | Berthoux et al. | 360/133 |
| 4,089,029 | 5/1978 | Castrodale et al. | 360/86 |

FOREIGN PATENT DOCUMENTS

| | | | |
|---|---|---|---|
| 2330358 | 1/1974 | Fed. Rep. of Germany | 360/99 |
| 2330818 | 4/1976 | Fed. Rep. of Germany | 360/99 |

Primary Examiner—Alfred H. Eddleman
Attorney, Agent, or Firm—A. Donald Stolzy

[57] ABSTRACT

Apparatus to guide and to clamp a memory sheet (recording media) for use.

5 Claims, 5 Drawing Figures

CLAMPING DEVICE FOR DISK-SHAPED MEMORY SHEETS

BACKGROUND OF THE INVENTION

The present invention relates to a centering and clamping device for disk-shaped memory sheets (recording media) having concentric holes in the center.

PRIOR ART STATEMENT

Clamping devices of the kind described herein are chiefly used for interchangeable disk-shaped memory sheets which are contained in protective envelopes. Openings in the envelope provide access to a memory sheet. This kind of memory sheet has become known as a floppy disk, and is described in detail in the U.S. Pat. No. 3,668,658 issued June 6, 1972.

It is conventional to drive either a conventional conical clamping member as is the case, for example, in the German Published Patent Application (DT-OS) No. 2,330,358, or to drive a pot-shaped clamping member, as has become known, for example, from the German Printed Pat. application (DT-AS) No. 2,330,818.

In the two above-described prior art embodiments, both clamping members are used together, but the driven member is fixed in a stationary position, while the clamping member that is not driven is mounted to swivel in such a way that the two clamping members may be disengaged for the purpose of inserting or removing a memory sheet. In the first-mentioned case, besides the pot-shaped clamping member, the memory sheet has a guide shaft that must still be swiveled for lifting the sheet off of the stationary conical clamping member.

SUMMARY OF THE INVENTION

In accordance with the apparatus of the present invention, the above-described and other disadvantages of the prior art are overcome by providing a centering and clamping device for disk-shaped memory sheets having circular holes in the center thereof, said device comprising: a frame having side walls; a frusto-conical member rotatable on one side wall; a cup-shaped member mounted on another side wall having a recess facing said frusto-conical member concentric therewith, said cup-shaped member having a rim around said recess, the diameter of said frusto-conical member growing smaller in the direction of said cup-shaped member, said frusto-conical member being movable in opposite directions through and out of a memory sheet hole into and out of said recess to center the memory sheet, said frusto-conical member having a shoulder to clamp the inner memory sheet edge against said rim of said member, said members being pivotally mounted about the same axis; power means for rotating said frusto-conical member in either direction about said axis to project said frusto-conical member into and withdraw the same from said recess, respectively, to first and second limiting stop positions, respectively; and motion means including a torque limiter for converting said rotary movements of said frusto-conical member to said axial movements thereof, respectively.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
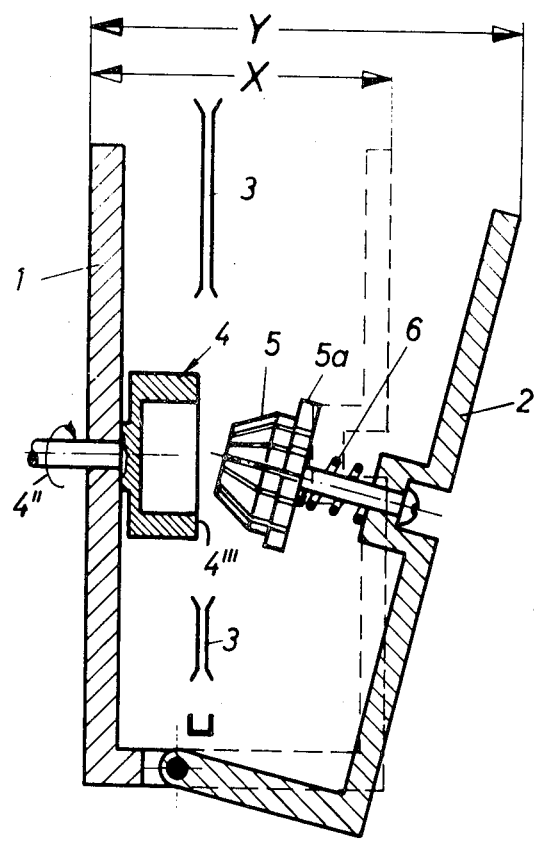
FIG. 1 is a schematic diagram of a conventional type of centering and clamping device for disk-shaped memory sheets.

The clamping devices to be described hereinafter are particularly intended for memory sheets (recording media) which, as already mentioned hereinbefore, are known as floppy disks. Since the floppy disk (also known as diskette, flexible disk or minidisk) in its protective envelope, has a lateral play of several millimeters, a proper alignment of the floppy disk cannot be effected via the plastic envelope. This has led to the development of a prior art device disclosed, e.g. in the German Printed Pat. application No. (DT-AS) 2,330,818 and schematically shown in FIG. 1. Here, a conical clamping member 5 in combination with a pot-shaped clamping member 4 serves to center a floppy disk (not shown) immediately prior to being clamped. In this type of embodiment the pot-shaped clamping member 4 is capable to being driven in a direction indicated by an arrow 4". Member 4 is axially fixed but mounted pivotally in a stationary frame 1. A guide 3 takes care of holding the inserted floppy disk firmly in position. A memory sheet is positioned close to and in front of a rim 44''' of the pot-shaped clamping member 4. For inserting or removing the floppy disk, the conical clamping member 5 is mounted pivotally and in an axially resilient manner (spring 6) within a member 2 of the device which is capable of being swiveled. FIG. 1 shows the swiveled-out position in which a free space exists between the pot-shaped and the conical clamping members 4 and 5, respectively. This permits a floppy disk to be freely inserted into or removed from the space between members 4 and 5. In the closed condition the device has an overall width X, in which the clamping member 5 engages the clamping member 4. The overall width Y is required in the opened state. This width Y is determinative of the installation width. When the member 2 of the device is swiveled into the locked position, the conical clamping member 5 is brought into engagement with the pot-shaped clamping member 4. When the floppy disk is inserted beforehand, the member 5 with its frusto-conical surface lies in contact with the contour of the hole in the center of an eccentrically displaced floppy disk. In the course of the further swivel movement the floppy disk is shifted to a position concentric with members 4 and 5. Member 5 does not rotate. Finally, under the pressure exerted by the spring 6, the floppy disk is clamped between rim 4''' of the driven clamping member 4 and a shoulder or collar portion 5a of the conical clamping member 5.

Opening movement of side wall 2, in addition to the size of the equipment, calls for a correspondingly large space. This is frequently disadvantageous, particularly in an automatic interchange of memory sheets where a lack of space makes the interchange difficult.

By swiveling the members 4 and 5, the memory sheet is centered. The member 5 enters the hole in the center of the sheet. In so doing, the member 5 is not rotated. Accordingly, static friction is produced between the inner edge of the sheet and member 5. In conjunction with the swivel movement, the contour of the hole in the sheet may be damaged, deformed or cause the sheet to be subjected to increased wear. This wear causes defective centering and produces unacceptable track deviations.

Figure 2:
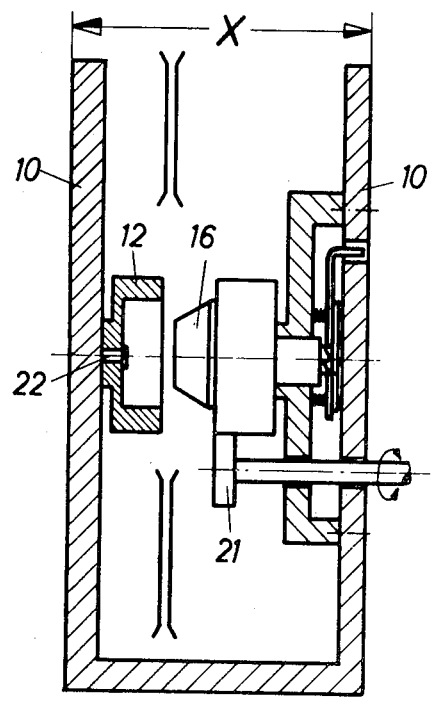
FIG. 2 is a schematic diagram of a centering and clamping device for disk-shaped memory sheets constructed according to the present invention.
Figure 3:
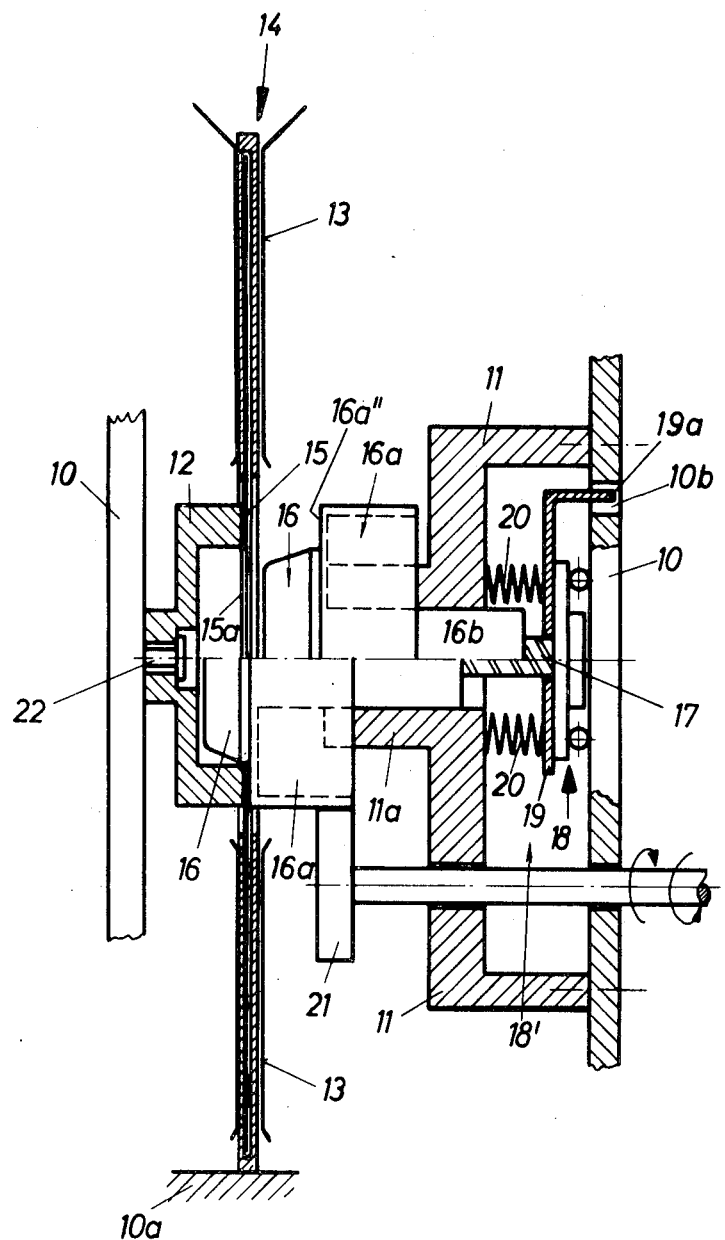
FIG. 3 is an enlarged diagrammatic view of the clamping device of FIG. 2.

FIG. 2 shows a centering and clamping device according to the present invention. In order to enable a comparison, the views of FIGS. 1 and 2 have been made on the same scale. Unlike the embodiment shown in FIG. 1, the width X in FIG. 2 is identical with the installation width. Side walls 10, 10 of the device are fixed relative to each other. One pot-shaped clamping member 12 and one frusto-conical clamping member 16 are axially aligned in relation to one another and each held in position on opposite side walls 10, 10. The pot-shaped clamping member 12 is mounted freely pivotally on a bolt 22 while the conical clamping member 16 is mounted pivotally on a spindle 17 (FIG. 3). Member 16 is rotated by the action of a friction wheel 21. In FIG. 2, quite depending on the direction of rotation of this friction wheel 21, the conical clamping member 16 is moved either into the shown, retracted position in which a floppy disk can be inserted, or else, by a continuous helical advance rotation, is brought into engagement with the pot-shaped clamping member 12. When member 16 is retracted, a floppy disk memory sheet is placed between members 12 and 16. The floppy disk is then centered via its central hole. The centering is performed carefully, and the floppy disk is clamped in position in a limiting stop position between the two clamping members 12 and 16.

FIG. 3 is an enlarged and different view of the embodiment of the present invention shown in FIG. 2. In FIG. 3, the clamping member 16, which is movable in the axial direction, is divided into upper and lower halves. The upper half shows the rearward position. The lower half shows the clamping position of the two members 12 and 16 with a memory sheet 15 positioned therebetween. Memory sheet 15 is centrically supported via an edge around its hole 15a. This memory sheet 15 forms part of a floppy disk 14, and floppy disk 14 is retained in a guide 13. A corresponding lateral guide and a supporting limit stop 10a effect an approximately centric position of the floppy disk 14 in relation to the clamping axis. Compared with this precentered position, the memory sheet 15 may deviate by the lateral play inside the protective envelope of the floppy disk 14. The hole 15a in the center of the memory sheet 15 and the conical clamping member 16 are dimensionally adapted to guide memory sheet 15 in a concentric clamped position.

The pot-shaped clamping member 12, as already mentioned in connection with FIG. 2, is mounted in a fixed axial position, but in a rotatable angular position on a bolt 12. Member 12 is axially aligned with the conical clamping member 16. Member 16 has a guide and threaded bushing 16b which is rotatably and axially movable on spindle 17. Via the guide and threaded bushing 16b, the conical clamping member 16 is exactly guided in a guide cylinder 11a forming part of a bearing bracket 11. The spindle 17 is supported at one end. Via a torque limiter 18', this spindle 17 is in connection with one side wall 10 of the frame. The torque limiter 18' includes a thrust ball bearing 18 which is firmly arranged at one end of the spindle 17. The surface of this ball bearing 18 faces the spindle 17 and is flat and in operative connection with a friction disk 19. Friction disk 19 is slipped on to the spindle 17 in a freely rotatable manner. This friction disk 19 engages with one arresting arm 19a in a recess 10b provided for in a side wall 10. Compression springs 20 are arranged between the bearing bracket 11 and the friction disk 19. They take care, on the one hand, of providing for the necessary friction force of the torque limiter 18 and, on the other hand, of applying the thrust ball bearing 18 to the side wall 10. Both the axial alignment and guiding of the spindle 17 and of the thrust ball bearing 18 are effected with the aid of the guide and threaded bushing 16b.

Apart from the guide and threaded bushing 16b, the conical clamping member 16 still has a cylindrical collar member 16a. One friction wheel 21 is in operative connection with the jacketing surface of this cylindrical collar member 16a. The width of this collar is preferably equal to the maximum axial movement of the clamping member 16 plus the width of the friction wheel 21. This friction wheel 21 is capable of being driven in both directions of rotation.

For inserting or removing a floppy disk 14 into or from the guide 13, the conical clamping member 16 must be in the retracted position, i.e. in the upper half of the view in FIG. 3. This position is determined, for example, by the limit stop of the spindle 17 inside the threaded bore of the guide and threaded bushing 16b. If, in this inoperative position, a floppy disk is inserted into the guide 13, it will actuate a switch (not shown) relative to the position of limit stop 10a. This switch triggers the automatic centering and clamping of the memory sheet 15. The drive is turned on upon actuation of the switch. In the course of this, the friction wheel 21, as seen from the drive, is driven in a counterclockwise direction. Member 16, when looked at from the same direction, will rotate in a clockwise direction. Since the spindle 17 is retained by the friction device 18', the conical clamping member 16, in the course of its rotation, and in accordance with the pitch of the thread of the spindle 17, screws itself into the hole 15a in the center of the memory sheet 15. In the course of this forward movement, the memory sheet is brought into its centric position via the conical surface of the rotating clamping member 16. This movement is stopped as soon as the face side or shoulder 16a" of the cylindrical collar member 16a, by interposition of the memory sheet 15, comes to lie against the rim of the pot-shaped clamping member 12. This final position is indicated in FIG. 3 in the lower half of the view. This causes the spindle 17 to be rotated by the continuously rotating member 16 upon overcoming the frictional forces of the friction device 18. These frictional forces are determinative of the contact pressure by which the memory sheet 15 is clamped between the two clamping members 12 and 16.

Upon reversing the direction of rotation of member 16, the spindle 17 is no longer rotated. Accordingly, the spindle 17 is stopped by the frictional forces. Owing to this, the member 16 is screwed back into its normal position. As soon as member 16 reaches its limiting stop position on the spindle 17, the latter is rotated again by overcoming the frictional forces of the friction device 18'. In order to avoid unnecessary wear, a further switch may be actuated upon reaching the limiting stop position, causing the drive to be switched off.

Instead of the friction wheel drive, it is also conceivable to provide for a friction-locked belt drive. Of course, it is also possible to provide for a form-locked driving of the member 16. In this case, the cylindrical collar member 16a would have to be designed as a toothed wheel engageable with a toothed-wheel or toothed-belt drive.

Some advantages of the present invention are achieved in that only a sliding friction occurs between the sheet and the rotating member 16 during centering. The forces acting upon the inner edge of the sheet in the course of this are substantially smaller than in the case where static friction exists. Owing to the axial displacement of member 16, a mounting of the one or the other of clamping members 12 or 16 capable of being swiveled may be dispensed with so that smaller installation dimensions of the device are permitted. Moreover, an automatic interchange of the memory sheets can be realized in a simple way.

Figure 4:
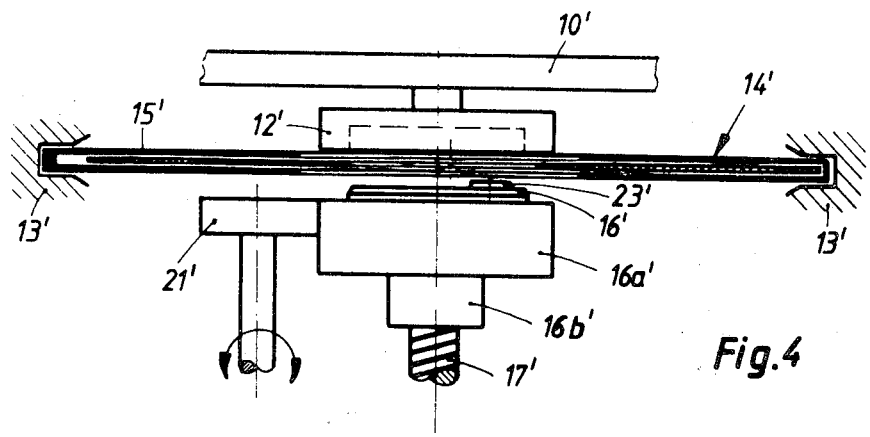
FIG. 4 is a diagrammatic view of an alternative embodiment of the present invention.

A clamping device as shown in FIG. 4 differs from the embodiment disclosed in FIGS. 2 and 3 by a frusto-conical clamping member 16' that has a reduced width. On the face side of the conical clamping member 16', for effecting coarse or precentering, there is mounted an eccentrically arranged centering piece 23". In the embodiment of FIG. 4 piece 23' is designed as a round flat attachment. This attachment 23' is arranged in such a way that it, on the outside, is flush with the edge portion of the face of member 16'—see FIG. 5. The width of piece 23' is at least equal to the thread pitch of a spindle 17'. Member 16' is capable of being axially adjusted by way of rotation, as before. The member 16' is driven via a friction wheel 21', which wheel 21' is capable of being driven in both directions. Wheel 21' is connected to cylindrical attachment 16a' of member 16'.

Member 16' is opposed by a pot-shaped clamping member 12'. Member 12' is mounted to a frame 10' of the device in a freely rotatable manner. A space between the face side of this clamping member 12' and the attachment 23' is normally provided which is equal to the thickness of one floppy disk 14'. Floppy disk 14' lies in alignment with lateral guides 13' via which the floppy disk 14' is inserted.

Figure 5:
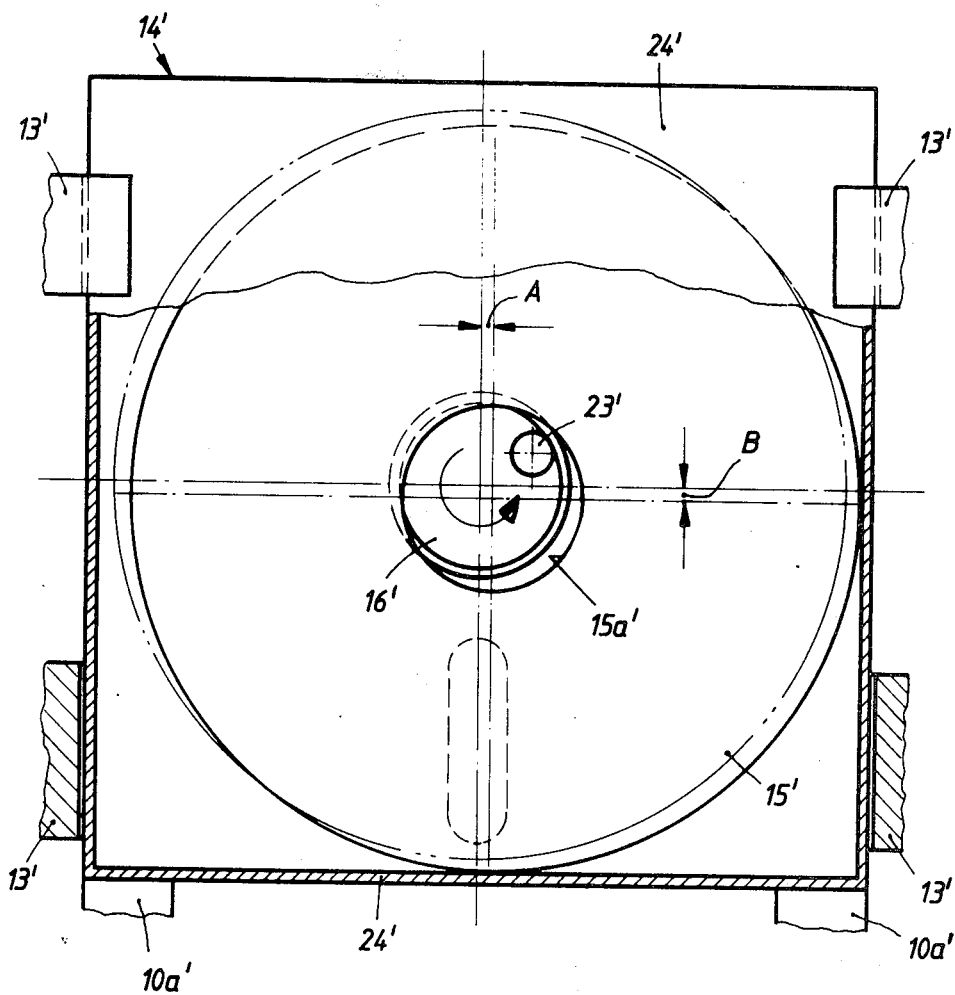
FIG. 5 is a front elevational view of the embodiment shown in FIG. 4.

According to FIG. 5, this floppy disk 14' consists of a circular memory sheet 15' having a concentric hole 15a' in its center. Sheet 15' is enclosed by a square protective envelope 24'. Envelope 24', in turn, and amongst others, has a concentric recess (not shown) which is larger than the hole 15a' in the center. This recess permits access to the memory sheet 15' from the outside. The memory sheet 15', inside the protective envelope 24', has a slight lateral play A and B compared with the centered position.

Owing to the small width of conical clamping member 16', movement of member 16' to the clamping position is smaller than that of member 16 in FIGS. 2 and 3. Accordingly, the width of the cylindrical attachment 16a' may be narrower. Also, the pot-shaped clamping member 12' may be flatter because the member 16' need not extend deep thereinto in the clamping position.

In the following, and with reference to FIG. 5, the mode of operation of the described clamping will now be explained. In the view there is shown the arrangement according to FIG. 4 seen from the side of the pot-shaped clamping member 12'. For the sake of clarity member 12' is not shown. The floppy disk 14' with its protective envelope 24' is laterally held in the guides 13'. Supporting limits 10a restrict the position in the direction of insertion. The memory sheet 15' is permitted to assume the shown eccentric position thereof.

In centering, the attachment 23' on the face side of the conical clamping member 16' engages the hole 15a' in the center of the memory sheet 15' during the rotatory forward movement of the clamping member 16 after it has rotated 180 degrees or less. In the course of completing the first rotation, the concentrically rotating attachment 23' will take the memory sheet along and bring it into a pre-centered position. In the course of this first rotation, the member 16', because of the spindle bearing, becomes displaced forwardly to such an extent that the short cone of the clamping member 16' will enter the area of the memory sheet 15'. Owing to the coarse of pre-centering as described hereinbefore, the cone is still left to perform the fine centering. The process of the fine centering is completed in the course of the second rotation of the clamping member 16. The advance movement is terminated upon reaching the clamping position (dash-and-double-dot-line) in which the memory sheet 15' is firmly clamped in position between the face side of the cylindrical attachment 16a' (cf.16a" in FIG. 3) and the pot-shaped clamping member 12'. Members 12' and 16' are thus then caused to rotate together with sheet 15'.

In order to accelerate the pre-centering process, two attachments 23' may be arranged diametrically, or three attachments 23' may be arranged triangularly on the face side of the conical clamping member 16' by being flush with the edge portion thereof. In this way the maximum angle of rotation, until an attachment 23' is brought into engagement with the hole 15a' in the center of the memory sheet 15', is reduced to one half or one third, respectively.

Instead of the three attachments 23', the centering piece may also be designed as a triangle whose corners are rounded and which are flush with the edge portion of the face side of member 16'.

What is claimed is:

1. A centering and clamping device for disk-shaped memory sheets having circular holes in the center thereof, said device comprising: a frame having side walls; a frusto-conical member rotatable on one side wall; a cup-shaped member mounted on another side wall having a recess facing said frusto-conical member concentric therewith, said cup-shaped member having a rim around said recess, the diameter of said frusto-conical member growing smaller in the direction of said cup-shaped member, said frusto-conical member being movable in opposite directions through and out of a memory sheet hole into and out of said recess to center the memory sheet, said frusto-conical member having a shoulder to clamp the inner memory sheet edge against said rim of said member, said members being pivotally mounted about the same axis; power means for rotating said frusto-conical member in either direction about said axis to project said frusto-conical member into and withdraw the same from said recess, respectively, to first and second limiting stop positions, respectively; and motion means including a torque limiter for converting said rotary movements of said frusto-conical member to said axial movements thereof, respectively.

2. The invention as defined in claim 1, wherein said motion means includes a friction device and a spindle, said frusto-conical member being pivotally mounted on said spindle by said friction device on said frame.

3. The invention as defined in claim 1, wherein said frusto-conical member has a cylindrical collar member which is in driving engagement with said power means.

4. The invention as defined in claim 1, wherein sad frusto-conical member is projectable through a memory sheet hole, said frusto-conical member having a face to enter said recess, said frusto-conical member having a periphery, said frusto-conical member having a centering piece on said face for effecting coarse centering, said centering piece having a thickness at least equal to the axial advance movement of said frusto-conical member in the course of one rotation thereof, said centering piece being flush with the said periphery and of said face at least at one point therearound.

5. The invention as defined in claim 4, wherein said centering piece is a round, flat attachment.

* * * * *